(12) United States Patent
Miller et al.

(10) Patent No.: US 8,866,069 B1
(45) Date of Patent: Oct. 21, 2014

(54) GAMMA PROBE HEALTH DETECTION ASSEMBLY

(71) Applicant: Reme Technologies, LLC, Conroe, TX (US)

(72) Inventors: Kenneth Miller, Houston, TX (US); Abraham Erdos, Houston, TX (US); David Erdos, Houston, TX (US); James Mathieson, Conroe, TX (US); Joshua Carter, Conroe, TX (US)

(73) Assignee: Reme Technologies, LLC, Conroe, TX (US)

( * ) Notice: Subject to any disclaimer, the term of this patent is extended or adjusted under 35 U.S.C. 154(b) by 0 days.

(21) Appl. No.: 14/304,685

(22) Filed: Jun. 13, 2014

Related U.S. Application Data

(63) Continuation-in-part of application No. 14/174,700, filed on Feb. 6, 2014.

(60) Provisional application No. 61/835,188, filed on Jun. 14, 2013, provisional application No. 61/886,509, filed on Oct. 3, 2013, provisional application No. 61/976,347, filed on Apr. 7, 2014.

(51) Int. Cl.
*G01V 5/04* (2006.01)
*G01V 8/20* (2006.01)

(52) U.S. Cl.
CPC ........................................ *G01V 8/20* (2013.01)
USPC .......................................................... 250/261

(58) Field of Classification Search
USPC .......................................................... 250/261
See application file for complete search history.

(56) References Cited

U.S. PATENT DOCUMENTS

| | | | | |
|---|---|---|---|---|
| 5,959,547 | A | * | 9/1999 | Tubel et al. ................. 340/853.2 |
| 6,604,582 | B2 | * | 8/2003 | Flowers et al. ............. 166/332.1 |
| 2005/0145416 | A1 | * | 7/2005 | Reed et al. ....................... 175/40 |

* cited by examiner

*Primary Examiner* — David Porta
*Assistant Examiner* — Mindy Vu
(74) *Attorney, Agent, or Firm* — Morgan, Lewis & Bockius LLP

(57) ABSTRACT

An improved gamma controller health detection assembly to facilitate reliable downhole measurement of naturally occurring radiation is disclosed. The gamma controller assembly includes one or more gamma sensors, a micro-controller, memory, and input/output ports among other components. The gamma sensors detect radiation and output pulses that are received by the microcontroller. The sensor data can be checked, selected, and averaged by the microcontroller, and sent uphole to another microcontroller or computer that can then further process, communicate, and display the data. The sensor data can be averaged and stored to memory or stored as independent values to memory. The gamma controller health detection assembly can be configured to run algorithms that detect if one or more gamma sensors appear to be malfunctioning or have previously malfunctioned.

28 Claims, 15 Drawing Sheets

GAMMA PROBE HEALTH DETECTION ASSEMBLY

RELATED APPLICATIONS

This application is a continuation-in-part of U.S. Non-Provisional patent application Ser. No. 14/174,700 filed on Feb. 6, 2014, which is herein incorporated by reference in its entirety. This application further claims the benefit of U.S. Provisional Patent Application Ser. No. 61/835,188 filed on Jun. 14, 2013, U.S. Provisional Patent Application Ser. No. 61/886,509 filed on Oct. 3, 2013, and U.S. Provisional Patent Application Ser. No. 61/976,347 filed on Apr. 7, 2014, each of which is herein incorporated by reference in its entirety.

BACKGROUND

1. Field of the Invention

The present invention relates to downhole radiation measurement assemblies.

2. Description of the Related Art

Downhole radiation measurement assemblies have been used in drilling operations for some time. In downhole drilling it is useful identify sub-surface rock formations and customize drilling assemblies and drilling methods to suit a particular geological formation. This can be useful when, for example, a drilling rig has been configured to be effective for a particular type of rock formation and characteristics of the rock formation change as the wellbore extends deeper beneath the surface. It would thus be useful to identify rock formations present at various drilling depths at a wellsite. Downhole radiation measurement assemblies measure the naturally occurring low level radiation that is given off by rock formations downhole. Different types of rock can give off differing amounts of radiation or radiation having other differing characteristics and if measured accurately, the type of rock formations at different depths can be identified. Often, radiation measurement assemblies are deployed downhole and many measurements are taken at different depths in a well. The sensor measurements can then be communicated uphole and processed to determine the particular types of rock formations present at various depths at a particular wellsite. Radiation measurement assemblies can experience harsh vibrations and temperatures as well as other environmental conditions during the installation process, when taking radiation measurements, while sitting downhole, and also during retrieval. Over time drilling operations have seen drilling to greater depths, causing radiation measurement assemblies to experience increasingly harsher environments. In addition, many of the radiation measurement sensors can be particularly sensitive and malfunction in response to vibration, harsh temperatures, and other environmental factors. Vibration factors can be particularly problematic for radiation measurement sensors used in downhole radiation measurement assemblies. This can be due in part to the construction and sensitive components of radiation measurement assemblies. These factors and others continue to create the need for more advanced and reliable downhole radiation measurement assemblies.

Radiation measurement assemblies are commonly deployed with measurement while drilling tools. The purpose of measurement while drilling tools is to collect various sensor based measurements and facilitate the communication of the measurements to the surface. Measurement while drilling tools can be deployed with sensors for measuring various downhole conditions such as temperature, flow data, drillstring rotation, location information, radiation readings, or other useful downhole conditions. The sensors deployed alongside or as a part of measurement while drilling tools will often be configured to communicate data with the microcontroller or microprocessor that is a part of the measurement while drilling tool assembly deployed downhole. This communication may be made using standard protocols that transmit over bus connections between the measurement while drilling tool and the various sensors. Measurement while drilling tools can then communicate data from the sensors uphole to remote computers or data logging equipment. Measurement while drilling tools can be deployed by wireline or inline with the drillstring and can include remote power supplies or receive power over cabling run downhole. It is common to deploy a radiation probe that is connected to a measurement while drilling tool downhole to perform radiation measurements at various depths. The measurement while drilling tool can be configured to receive gamma probe data, which for example may be in the form of a pulse train, and then process and communicate the data to remote computers on the surface.

It would be desirable to have radiation measurement assemblies that include greater resilience to vibration, harsh temperatures, and other environmental factors that are present downhole. Further, it would be desirable to provide increased meantime between failures of radiation measurement assemblies installed downhole. This would allow greater drilling time, increased measurement time, and decreased time spent installing, retrieving, and servicing radiation measurement assemblies. It would further be desirable to decrease the time committed to servicing radiation measurement assemblies due to the failures of radiation measurement sensors that are particularly sensitive to the harsh environments downhole.

SUMMARY OF THE INVENTION

The present invention provides an improved gamma probe health detection assembly including advanced gamma fail detection prediction algorithms and methods. Radiation measurements are taken by one or more gamma sensors that are part of the improved gamma probe health detection assembly. When the one or more gamma sensors detect radiation they transmit pulses to a microcontroller that interprets and checks the measurements. The measurements can be logged, communicated uphole, or both. In an embodiment the microcontroller writes the measurements to memory downhole and the memory contents are later retrieved from the tool at the surface or offsite. Once sent or retrieved uphole, the measurements can then be further processed and communicated to determine and display the make-up of geological formations downhole. The gamma controller assembly includes one or more gamma sensors, one or more microcontrollers, memory for storing the program run by the gamma controller assembly and input/output ports among other components. Additional memory for logging gamma sensor readings can also optionally be configured. Gamma sensor data from an embodiment including multiple gamma sensors can be selected or averaged by the microcontroller and stored to memory or stored as independently logged values to memory. The sensor data can then be sent uphole to another microcontroller or computer based system that can then further process, communicate, and display the data. The gamma controller assembly can be configured to run gamma probe health detection algorithms that detect if one or more gamma sensors appear to be malfunctioning, and if an apparent malfunction has occurred, the assembly can be configured to communicate only the data from the correctly functioning sensors uphole.

In another embodiment the gamma controller assembly can send all sensor data uphole and communicate what data is trusted and what data is not trusted. Once uphole, the gamma sensor data can then be further communicated to another microcontroller or computer based system for additional evaluation, processing, storage, or display.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

Figure 1:
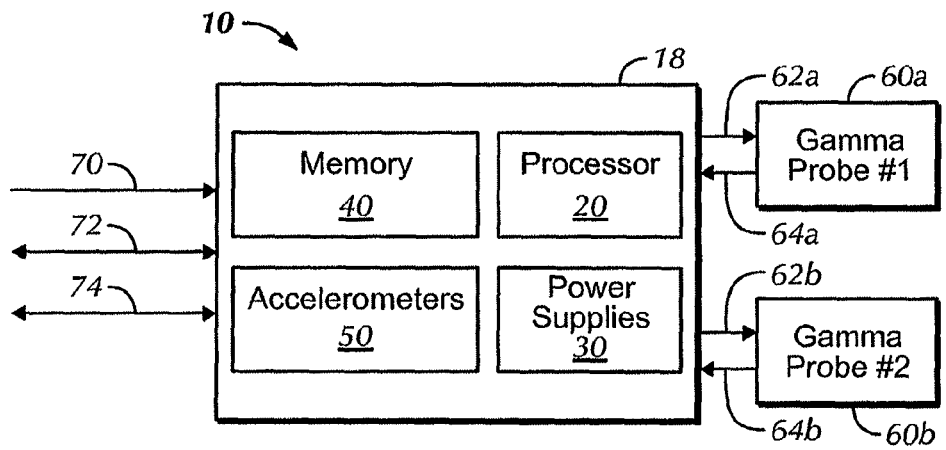
FIG. 1 depicts a block diagram of an embodiment of the gamma probe health detection assembly, also referred to as a multiple gamma controller assembly.

One purpose of the improved gamma controller assembly can be to increase the reliability of downhole gamma sensor measurements. One of the frequent failures in a measurement while drilling system is for the gamma probe to fail. This can be very costly to remedy as the entire drill string has to be pulled from the well to replace the gamma probe, if there is even a spare available.

To mitigate this failure mode, the gamma probe health detection controller assembly facilitates redundant gamma probes in a single measurement while drilling tool, a configuration which can also be referred to as a multiple gamma controller assembly. The gamma probe health detection assembly can also utilize just a single gamma probe and run advanced failure detection algorithms to determine when the single probe has failed or may be nearing failure. Additionally, readings from single or multiple gamma probes can be post analyzed at the surface or offsite using advanced algorithms to determine if the runs can be trusted over certain time periods. The multiple gamma controller assembly can also be configured to log various parameters of the tool downhole to assist with failure analysis when the tool is serviced. Using heuristics, if the multiple gamma controller assembly determines that each gamma probe is operating correctly, the multiple gamma controller assembly can then output a single pulse train which can be a combined and filtered or alternately a single averaged reading from the multiple individual gamma probes to the measurement while drilling tool. In an alternate embodiment, the combined, filtered, or averaged reading output by the multiple gamma controller assembly can be communicated over a CAN bus or other bus known in the industry, to either the measurement while drilling tool or to other equipment uphole via mud pulsers, signal lines, or other communication methods. If however the multiple gamma controller assemblies' heuristics determine that one of the gamma probes has failed, it can exclude the failed gamma probe from the filtered output and only output a filtered pulse train based on the readings from the remaining gamma probes. In the preferred embodiment, it is preferred that two gamma sensor probes would be configured in each multiple gamma controller assembly; however, it is equally possible that three or more probes could be configured in a single assembly. For this embodiment the multiple gamma controller assembly may also be referred to as a dual gamma controller assembly. The mode in which a single pulse train is output to the measurement while drilling tool in particular can be designed to work with measurement while drilling systems that expect to see one pulse train from a single gamma sensor downhole. In an alternate embodiment, data from each gamma sensor can be communicated to a measurement while drilling tool or uphole with an indicator as to what sensor data may be trusted and what sensor data may be incorrect due to a possibly malfunctioning gamma probe.

Figure 2:
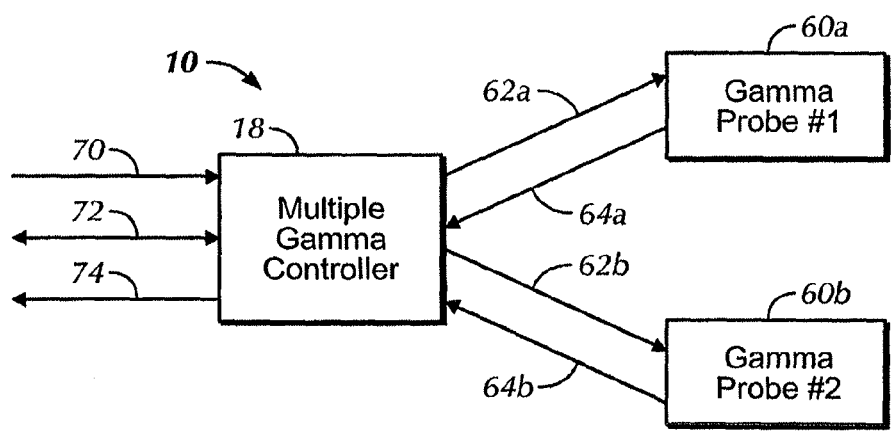
FIG. 2 depicts a schematic representation of the multiple gamma controller assembly of FIG. 1.
Figure 3:
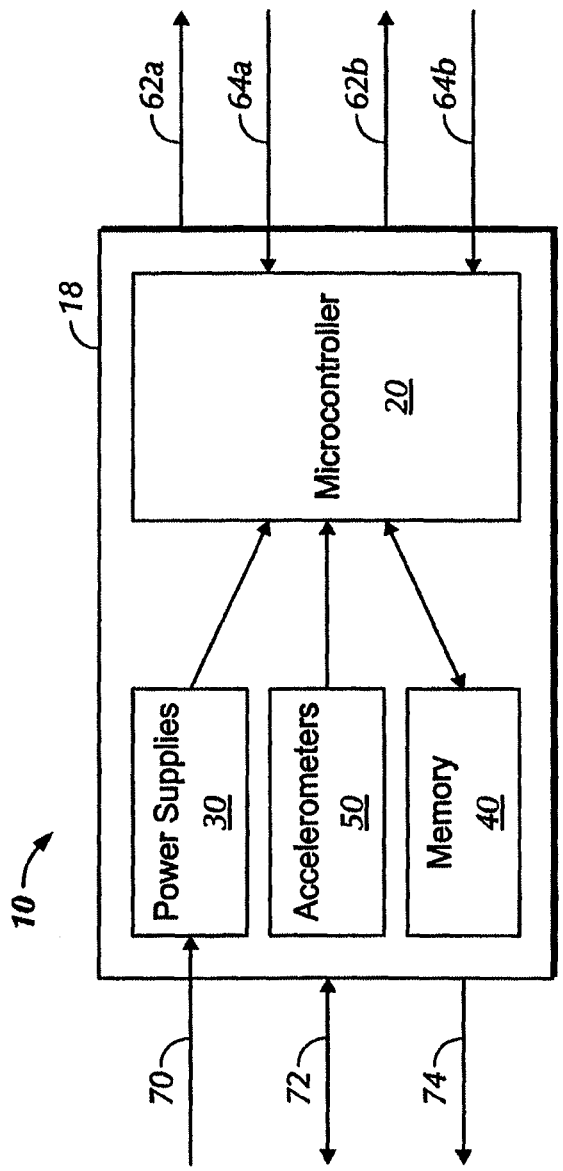
FIG. 3 depicts a schematic representation of the multiple gamma controller assembly of FIG. 1.

Referring to FIGS. 1, 2, and 3, the gamma probe health detection assembly, which can also be referred to as a multiple gamma controller assembly 10 has a controller module 18 that can be configured to include one or more microcontrollers or processors 20; one or more power supplies 30; memory 40 for storing the main executable program, for logging, and for storing configuration parameters; and accelerometers 50 or similar sensors for sensing shock and vibration. The multiple gamma controller assembly 10 further includes multiple gamma probes 60a and 60b, though more than two probes can be configured in an alternate embodiment. Additionally, in an alternate embodiment of the gamma probe health detection assembly, just one gamma probe may be configured, in this embodiment the assembly can be configured with advanced gamma probe health detection algorithms. Optionally, advanced gamma probe health detection algorithms can also be utilized in an embodiment having multiple probes configured. The controller module 18 can be configured to provide power to the gamma probes 60*a* and 60*b* over gamma probe power lines 62*a* and 62*b*. Data lines 64*a* and 64*b* also extend between the controller module 18 and the gamma probes 60*a* and 60*b*. In addition, the multiple gamma controller assembly 10 can be configured to include power lines 70, serial communication lines 72, and gamma sensor pulse output lines 74 that extend to a measurement while drilling tool (not shown) or from lines running from the surface to the tool. A single memory element can be shared for the main executable program, logging, and storing configuration parameters, or multiple memory elements can be utilized. There are three primary functions of the microcontroller or processor 20: (1) monitoring the health of the gamma probes, (2) logging tool parameters for failure analysis, and (3) sending gamma probe measurement data to a measurement while drilling tool or directly uphole. The multiple gamma controller assembly 10 can have multiple modes of operation, which are not mutually exclusive. In an embodiment the multiple gamma controller assembly 10 can have a transparent mode, where the controller will simply output a combined, filtered, or averaged pulse train to a measurement while drilling tool (not shown), and thus appearing to the measurement while drilling tool as a single gamma probe. This approach provides additional accuracy and reliability to current systems that are only configured to interact with a single gamma probe. In this mode, the measurement while drilling systems are "tricked" into thinking they are only receiving output from a single probe. In fact, this approach provides increased accuracy and reliability for low bandwidth systems that could not provide enough bandwidth to transmit data from multiple gamma sensors uphole. An alternate mode of operation allows the multiple gamma controller assembly to transmit data from the gamma probes and overall tool health status to the measurement while drilling unit as generic data values over the serial bus inside the tool, or over other bus types. For many types of measurement while drilling tools, this bus can have limited bandwidth, but for higher bandwidth systems, more sensor data could be communicated using this mode. Finally, if higher bandwidth systems are used, another alternate embodiment can allow for sensor data from each gamma probe sensor to be sent to the measurement while drilling tool or even uphole as separate pulse trains or by other means that would allow all of the sensor data or data from a select multiple number of sensors to be sent uphole.

Figure 4:
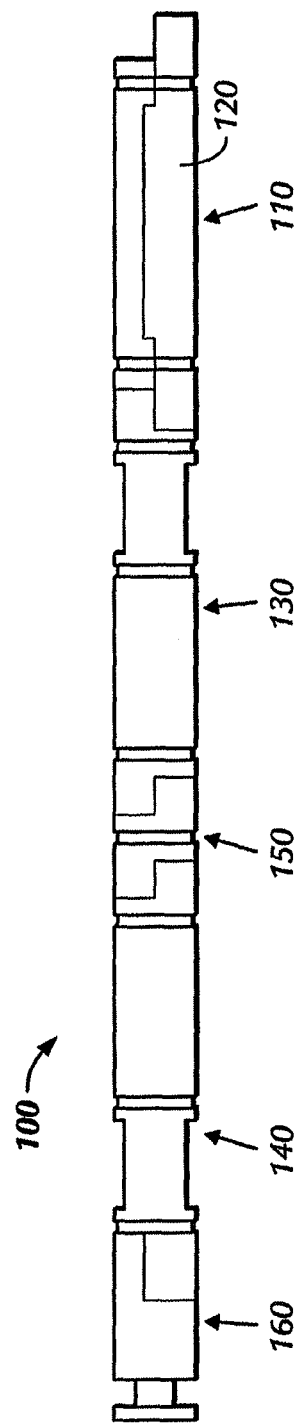
FIG. 4 depicts a side view of the multiple gamma controller assembly of FIG. 1.
Figure 5:
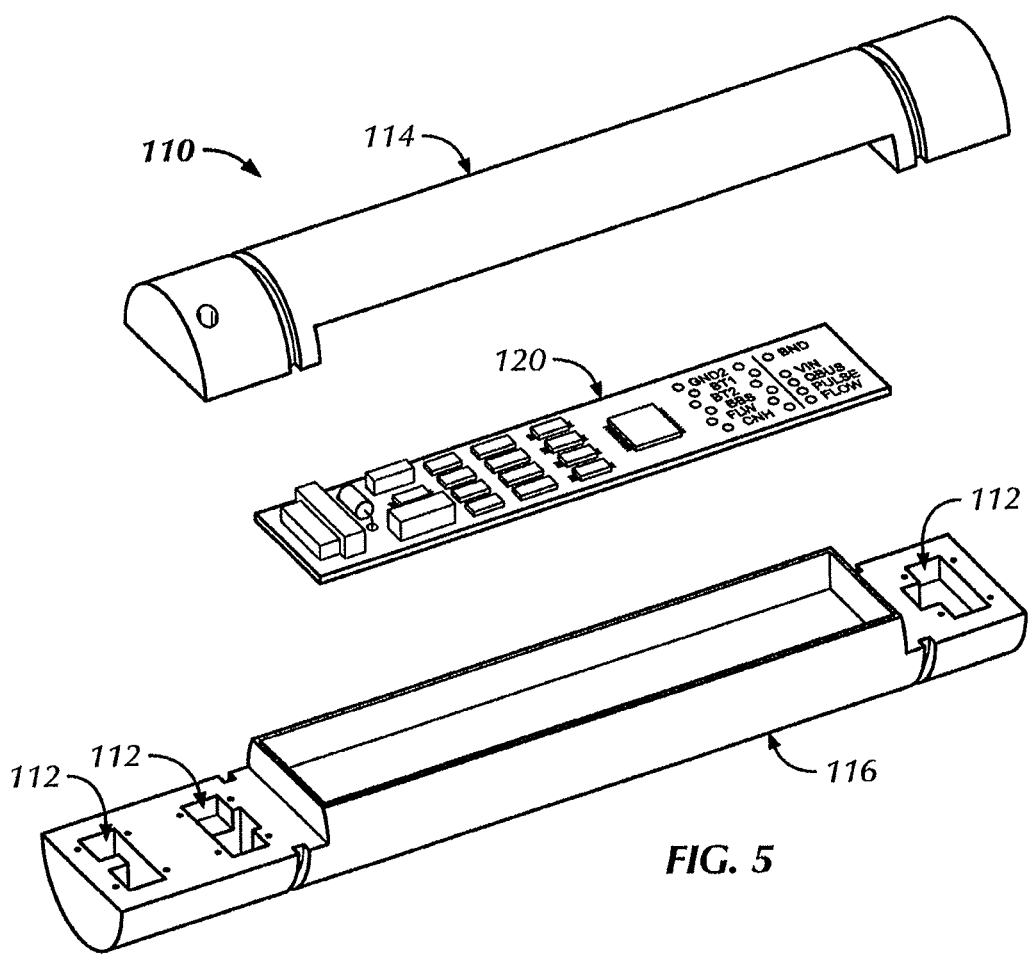
FIG. 5 depicts a side perspective view of the multiple gamma controller assembly of FIG. 1.

Referring to FIG. 4, a multiple gamma stack assembly 100 is shown. The multiple gamma stack assembly 100 includes a multiple gamma controller chassis 110 that includes a controller circuit board module 120; a first gamma module 130; a second gamma module 140; a bus-cross-over module 150, and a snubbing end 160. Referring to FIG. 5, the multiple gamma controller chassis 110 houses the controller circuit board module 120 that is analogous to controller module 18 referenced in FIGS. 1-3. Module 120 can be configured to include one or more microcontrollers or processors; one or more power supplies or power supply voltage regulators; memory for storing the main executable program, for logging, and for storing configuration parameters; and accelerometers or similar sensors for sensing shock and vibration. In an embodiment, each of these sub-components may alternately be configured on separate circuit boards or as a part of other modules within the system. The chassis 110 provides sturdy connection ports 112 for connecting electrical lines between modules. A top hatch 114 and bottom hatch 116 protect the controller circuit board module 120 from the harsh downhole environments and also allow easy access for servicing. In alternate embodiments, different protective enclosures can be configured to protect the controller circuit board module 120 and the various other components of the multiple gamma stack assembly 100.

Figure 6:
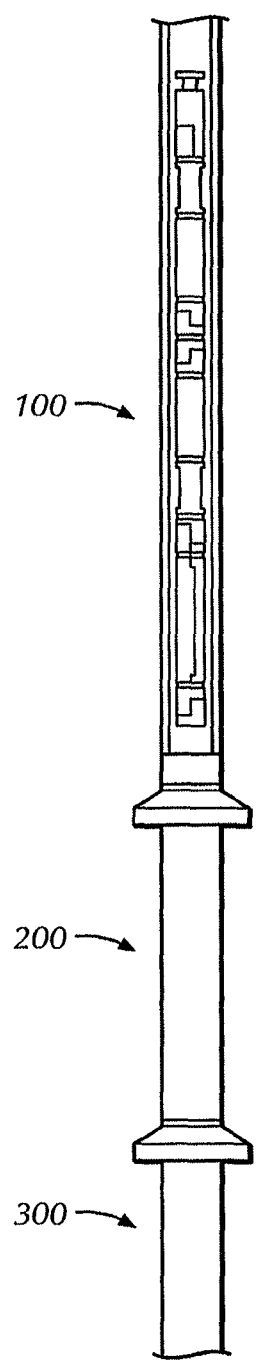
FIG. 6 depicts a side view of the multiple gamma controller assembly of FIG. 1.
Figure 7:
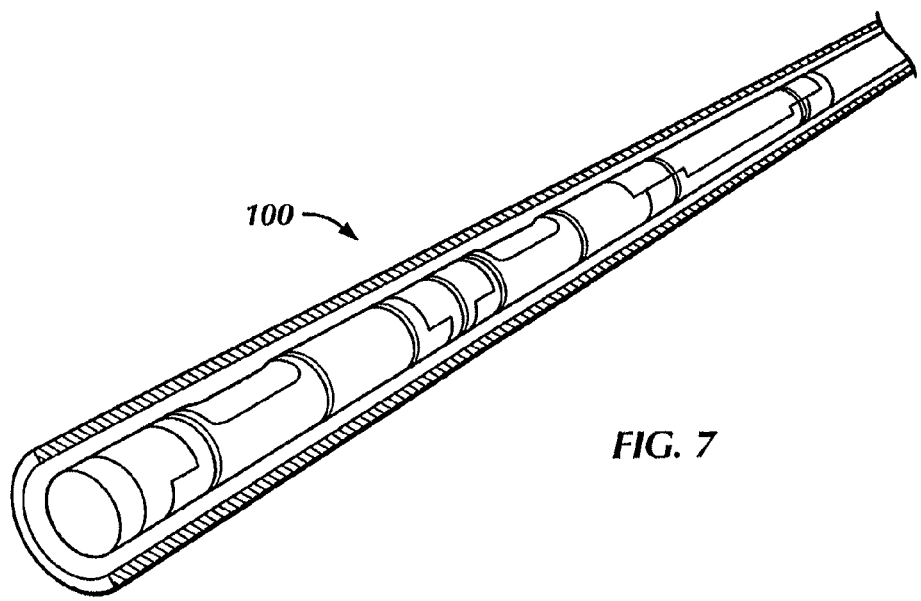
FIG. 7 depicts a side perspective view of the multiple gamma controller assembly of FIG. 1 within a well bore.
Figure 8:
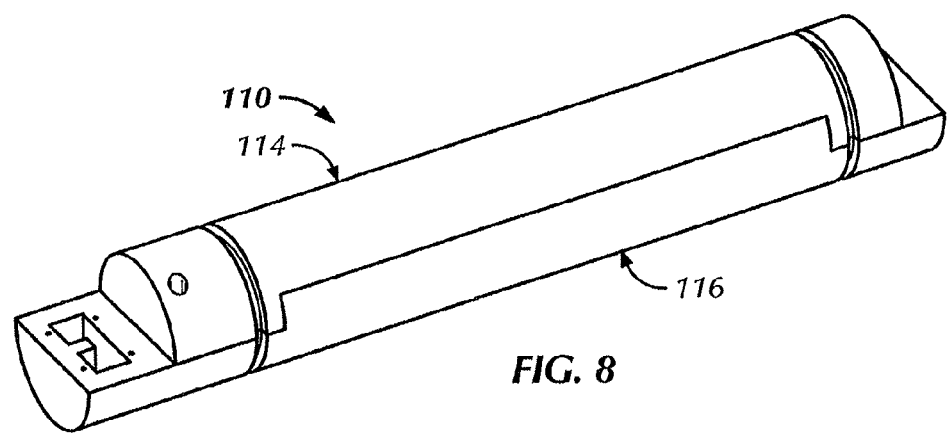
FIG. 8 depicts a side perspective view of an embodiment of the chassis of the multiple gamma controller assembly of FIG. 1.
Figure 9:
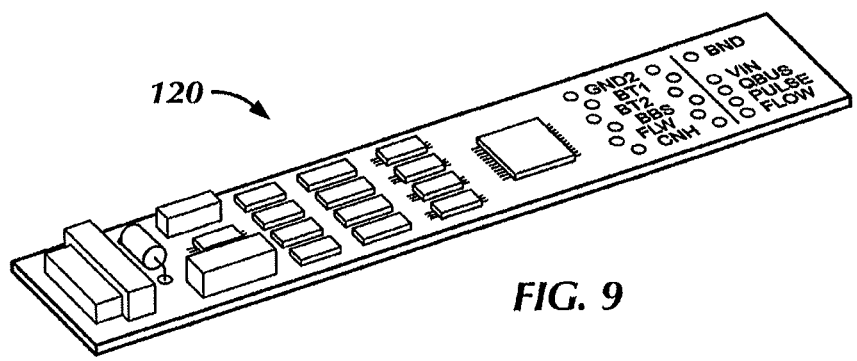
FIG. 9 depicts a side perspective view of an embodiment of the circuit board of the multiple gamma controller assembly of FIG. 1.

Referring to FIG. 6, a multiple gamma stack assembly 100 is shown connected to a battery unit 200 and a pulser driver 300. The pulser driver 300 is one example of a communication system that can be configured to send information uphole or to the surface and receive information downhole from the surface. The pulser driver 300 can be configured to send and receive pulses through the drilling mud that can be detected by sensors. The pulses can then be interpreted by the sensors or other connected equipment. When deployed downhole this configuration or similar configurations may be used, for example non-pulser based communications systems such as wire based systems may also be used to send information and communicate with surface equipment. Referring to FIG. 7, an alternate perspective view of an example of the multiple gamma stack assembly 100 is shown. Referring to FIG. 8, an example of the gamma controller chassis 110 is shown with the top hatch 114 connected to the bottom hatch 116, both of which serve to protect the controller circuit board module 120 from harm. FIG. 9 shows an example of the side perspective view of the controller circuit board module 120 that, as described above, can be configured to include various components of the multiple gamma controller assembly.

Figure 10:
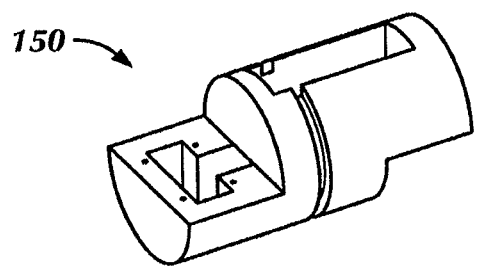
FIG. 10 depicts a side perspective view of an embodiment of a cross-over member of the multiple gamma controller assembly of FIG. 1.
Figure 11:
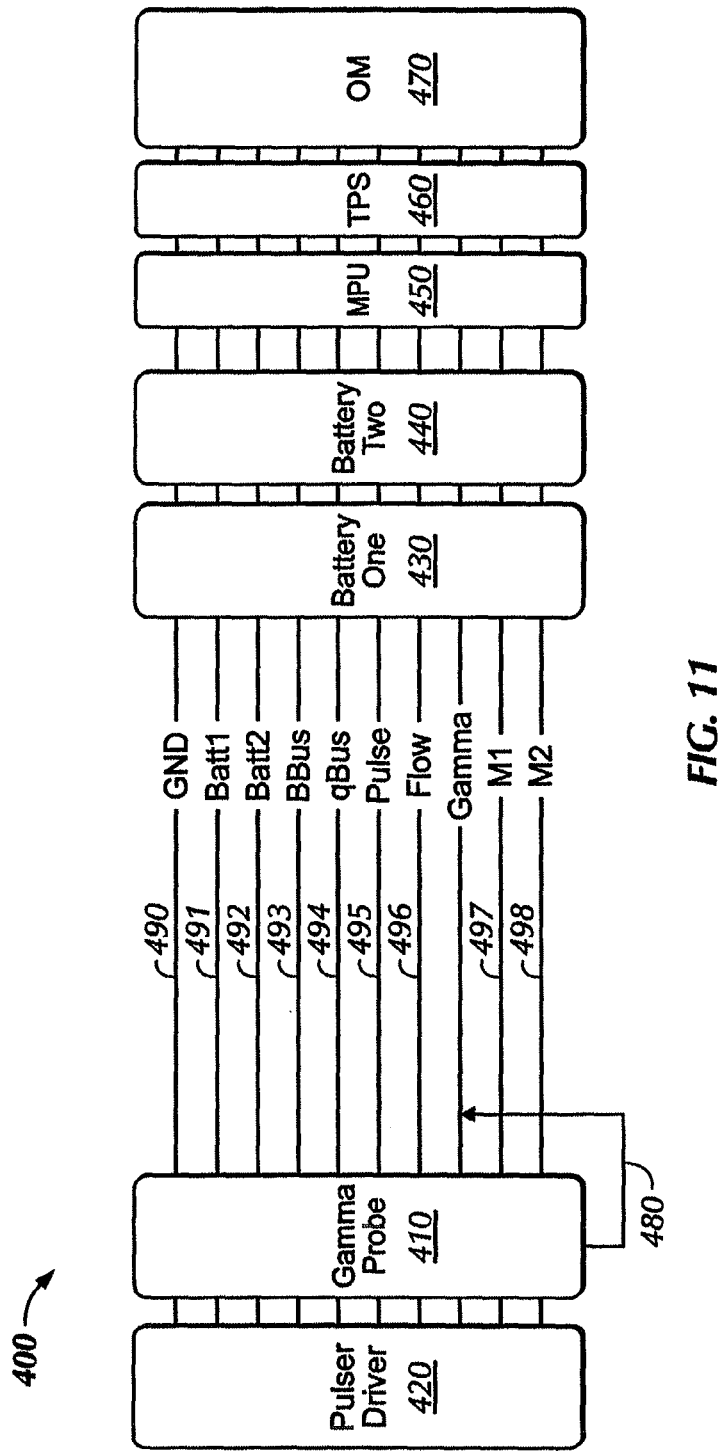
FIG. 11 depicts a block diagram of a measurement while drilling tool having only a single gamma sensor.

Referring to FIG. 10, an example of the bus cross-over module 150 is shown. For multiple gamma controller assemblies that include three or more gamma probes, multiple bus cross-over modules 150 can be configured to allow the connection of additional probes. In an embodiment, the bus cross-over module 150 facilitates the connection of multiple gamma probes to a multiple gamma controller in a system that was originally designed for the use with only a single gamma probe. The cross-over module 150 can be configured to place gamma probe output line data onto spare signal carrying lines of the bus, the multiple gamma controller can then read and interpret the output of the gamma probes in these lines. FIG. 11 is an example block diagram showing the components and wiring layout of a measurement while drilling tool 400 having a single gamma probe 410. In this example a pulser driver 420 serves as the surface communication link to the tool 400 and battery power is provided to the various components through battery one 430 and battery two 440. A main processing unit ("MPU") 450, triple power supply ("TPS") 460, and orientation module ("OM") 470 are also included in this configuration. The gamma probe 410 output radiation measurement readings on the gamma bus line 480. The readings are then processed by the MPU 450 which then sends representative data values or the full pulse train information to the surface through the pulser drive 420. In addition to the gamma bus line 480, the bus 405 that runs between the various components can include a ground line ("GND") 490, a battery one line ("Batt1") 491, a battery two line ("Batt2") 492, a BBus signal line ("BBus") 493, a qBus signal line ("qBus") 494, a pulse signal line ("Pulse") 495, a flow signal line ("Flow") 496, an m1 signal line ("M1") 497, and an m2 signal line ("M2") 498. The bus described carries power from the batteries to the various components and also serves as the communication links between the components.

Figure 12:
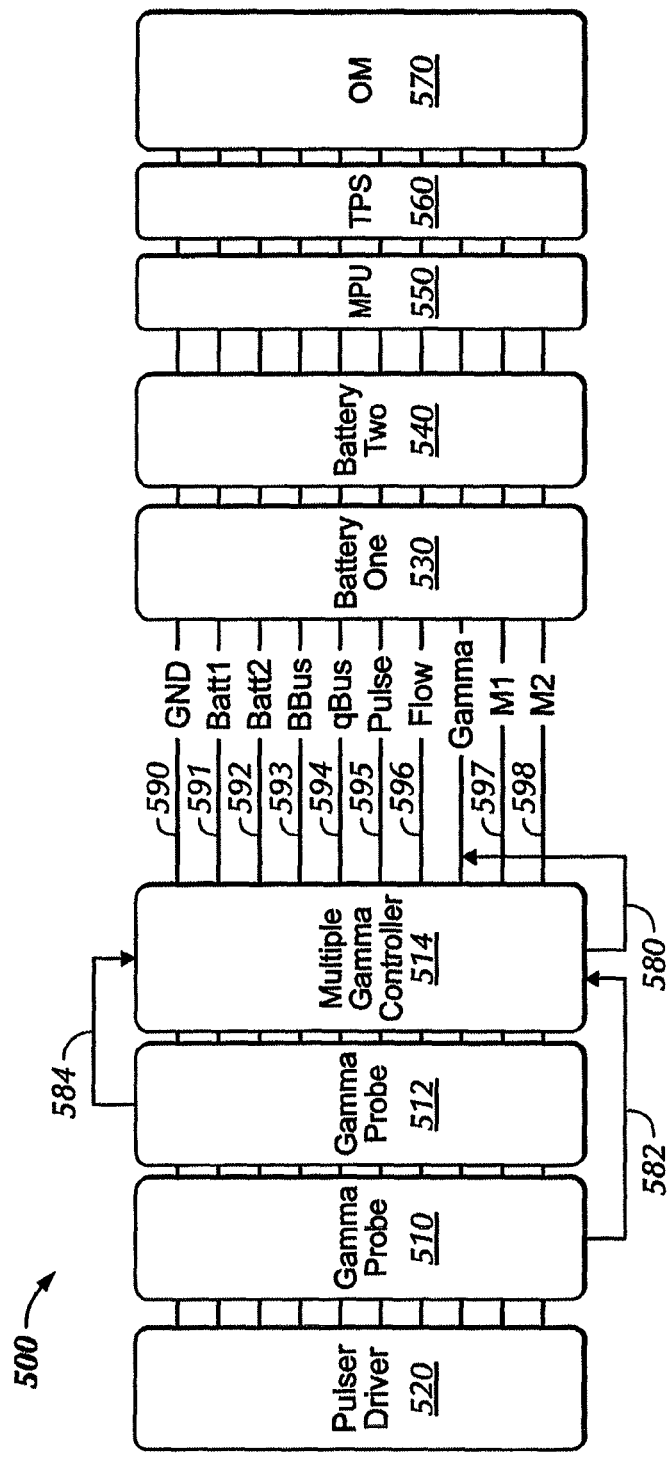
FIG. 12 depicts a block diagram of a measurement while drilling tool having the multiple gamma controller assembly of FIG. 1.

Referring to FIG. 12, an example block diagram showing the components and wiring layout of a measurement while drilling tool 500 having multiple gamma probes and a multiple gamma controller 514 is shown. Gamma probe 510 and gamma probe 512 output their radiation measurement readings to the multiple gamma controller 514. The bus cross-over module as described in FIG. 10 can be configured when implementing this layout to, re-route the output of each gamma probe onto spare signal lines that are part of the bus. In an embodiment, the gamma probe data can be routed to the microcontroller of the multiple gamma controller assembly and the microcontroller runs algorithms against the gamma probe output data to determine the gamma probe data to place onto the gamma probe output line or lines that can then be communicated to a measurement while drilling tool or other data channels that communicate the information uphole. Similar to the single probe configuration described in FIG. 11, in this example a pulser driver 520 serves as the surface communication link for the tool 500 and battery power can be provided to the various components through a battery one 530 and a battery two 540. A main processing unit ("MPU") 550, triple power supply ("TPS") 560, and orientation module ("OM") 570 can also be included in this configuration. The first gamma probe 510 outputs radiation measurement readings on the gamma output line 580 and the second gamma probe 512 outputs radiation measurement readings on the gamma output line 584. The readings are then received and processed by the multiple gamma controller 514, which combines, averages, or filters the readings using one or more of the methods described herein. The multiple gamma controller 513 then continuously generates a representative gamma output value that can be sent to the MPU 550 or the pulser driver 520 for communication uphole. Similarly to the methods described above, heuristics can be employed by the multiple gamma controller 514 and probe data can be adjusted, disqualified, and re-qualified accordingly. In addition to the gamma bus line 580, the bus that runs between the various components can include a ground line ("GND") 590, a battery one line ("Batt1") 591, a battery two line ("Batt2") 592, a BBus signal line ("BBus") 593, a qBus signal line ("qBus") 594, a pulse signal line ("Pulse") 595, a flow signal line ("Flow") 596, an m1 signal line ("M1") 597, and an m2 signal line ("M2") 598. The bus described carries power from the batteries to the various components and also serves as the communication links between the components. The bus described in this paragraph is merely one embodiment and configuration of the multiple gamma controller assembly. Other bus configurations, tool configurations, communication protocols, and communication topologies can be used in conjunction with the multiple gamma controller assembly. Using the methods described, a multiple gamma controller assembly can be integrated into a tool that typically only uses one gamma probe, such as the system described in reference to FIG. 11. Bus cross-over modules can be configured for use in the described system to carry the gamma probe output data over spare bus signal lines or alternatively other signal lines apart from the main bus can be used. The multiple gamma controller assembly can also be integrated into other types of systems that are configured to only use one gamma probe by default.

In an embodiment, the multiple gamma controller assembly can be configured to interact with multiple measurement while drilling tools, different types of measurement while drilling tools, or other tools that allow communication to the surface. For each of these tools, different amounts of bandwidth may be available to transmit data uphole and the multiple gamma controller assembly can be configured to send more or less gamma sensor data depending on the bandwidth available. For example, the frequency of the readings sent to the surface can be adjusted according to the bandwidth available for the transmission.

Further, in an embodiment, the filtering of the output counts from the multiple gamma probes could simply be the average of the counts per second (or other time interval) from the multiple gamma probes. Additionally, the filtering could also be a weighted average of the gamma sensor outputs, if certain sensors are determined to be in better health than the others. More advanced filtering may also be performed using a state estimator to estimate the overall background radiation based on the readings from the multiple gamma probes. The filtered output can also take into account the API calibration factors for each gamma probe, and these values can be stored in the multiple gamma controller assembly's memory.

The microcontroller or processor of the multiple gamma controller assembly can continually monitors the pulse train output of each gamma probe which should correspond directly to the gamma radiation levels downhole. The microcontroller can be configured to keep statistics about the performance of each gamma probe, and if, based on its heuristics it determines that one of the gamma probes has failed, it will exclude from the combined, filtered, or averaged, output the counts of the failed probe.

Several different heuristics can be used to determine if a gamma probe is or may be malfunctioning. In an embodiment, those heuristics may optionally include, but are not limited to: (1) high counts, that is counts greater than some threshold, (2) low counts, that is counts less than some threshold, (3) counts changing too quickly, meaning that the rate at which the counts are increasing or decreasing (the derivative of the counts per second with respect to time) is too high/low, (4) the standard deviation over time is increasing beyond an acceptable limit, (5) kurtosis analysis, (6) skew of counts over time, or (7) other statistical measurements. If a gamma probe is determined to be malfunctioning based on the heuristics, then, for a microcontroller operating in a single pulse train mode, the counts from the probe may no longer be included in the filtered output or pulse train of the microcontroller. Likewise, in a mode where multiple sensor outputs are being communicated to the measurement while drilling tool or uphole, when the heuristics detect the possible malfunction of a sensor, the output data for that sensor may be tagged as invalid or potentially incorrect. However, the outputs from the failed gamma probe will be continually monitored to determine whether or not the gamma probe has recovered. Occasionally gamma probes output unreasonably high counts as the temperature increases, or if a shock event occurs, but then recover once the temperature decreases or the shock/vibration levels decrease. If a failed gamma probe is determined to be within the operational limits once again for some set period of time, then it can once again be included in the filtered output or pulse train or the tagging included with the gamma probe data can be changed back to valid or good.

In an embodiment, the microcontroller can be configured to constantly compare the values read from both gamma probes and compare or check the health status data for each of the gamma probes as well. Generally, there are two main failure modes for the gamma probes, high counts and low counts. Either failure mode has to do with some portion of the standard gamma sensor failing. For example, the crystals can crack, the photomultiplier tubes can crack or otherwise fail, the high voltage power supply can drift or stop supplying power, and in some cases the discriminator circuit may fail as well. Typically these failures cause a gamma sensor to return no counts at all or abnormally high counts. Based on this notion the microcontroller of the multiple gamma controller assembly can be configured to run algorithms that check for high and low counts. In an embodiment, a low and a high threshold are set in accordance with readings anticipated from gamma sensors downhole. These threshold values may be adjusted for different types or brands of sensors, or to accommodate for desired thresholds at a particular wellsite. If the readings from any one gamma sensor exceed these bounds, high or low, it can be immediately disqualified from the system and any averaging calculation that may be performed in a given embodiment. In some of the alternate embodiments where gamma sensor readings from more than one gamma probe are conveyed, the data from an out of bounds probe can be merely flagged as invalid or disqualified. To be considered operational again, the reading must return to the acceptable range and stay within bounds for a set timeframe. If the sensor stays out of bounds for a large amount of time, it can be permanently disqualified from the calculation, at least for a given installation or over a certain time period.

In an alternate embodiment where three or more gamma probes are configured, a majority rules protocol can be put into place. In this setup the two probes with the closest counts are used and can be combined, averaged, or filtered, with the readings from the third probe being discounted for a given reading comparison or for a given time period. In this configuration, should one or more probes fail, the remaining probes can be switched from the majority rules protocol back to other methods where all of the probes values are again combined, averaged, filtered, or otherwise processed and then communicated to the measurement while drilling tool or uphole.

Some probes can also be sensitive to temperature and have counts that drift at temperature extremes. Comparing temperature readings to count data can be used to determine if a particular probe might be experiencing temperature drift and adjustment can be made to the count values from that probe. Alternatively, if a temperature drift passes a pre-determined threshold the probe can be disqualified temporarily and re-qualified later if readings return to within the pre-determined threshold.

Figure 13A:
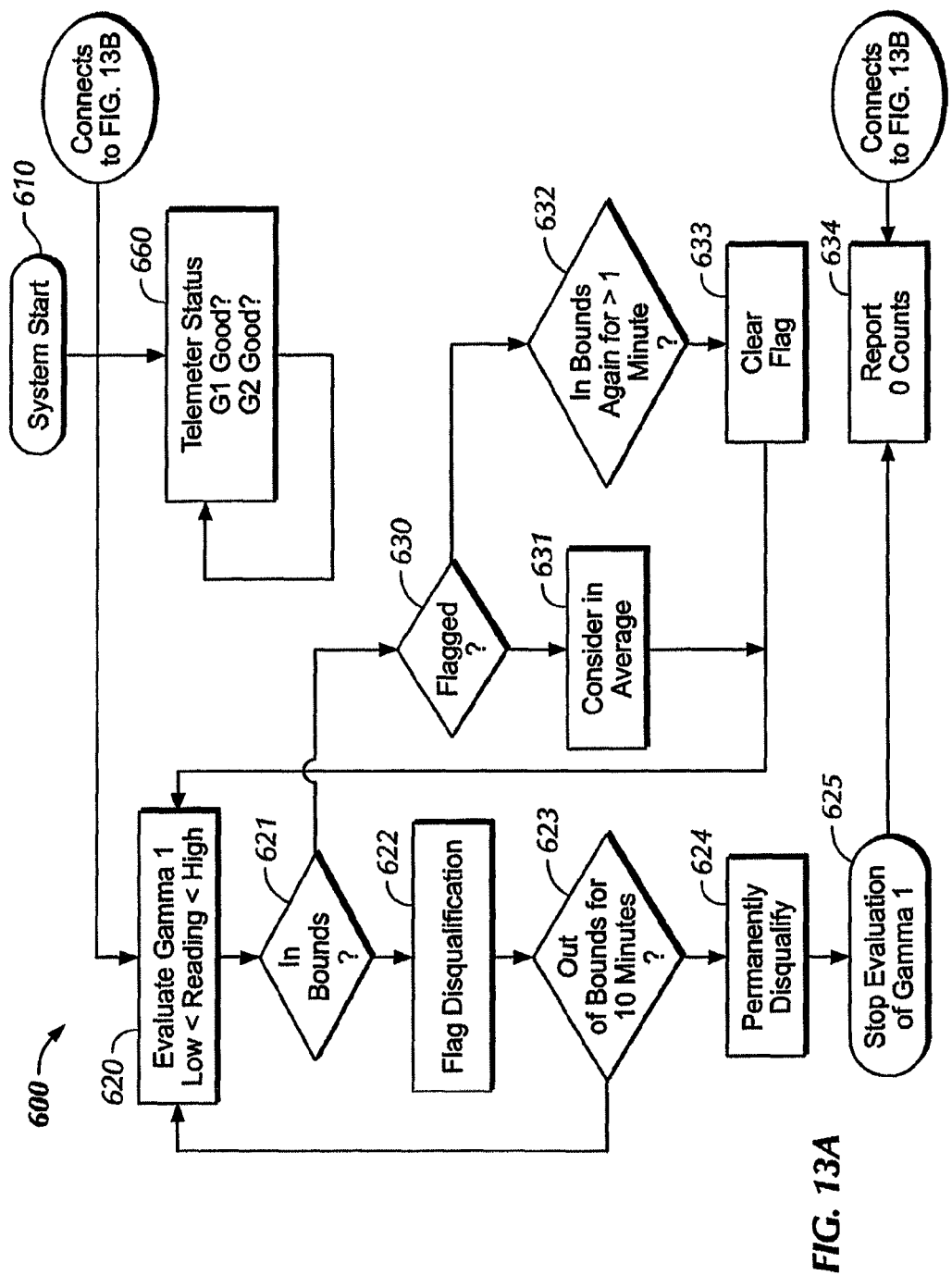
FIG. 13A depicts a first portion of a flow chart of a kick-out algorithm for the multiple gamma controller assembly of FIG. 1, with FIG. 13B depicting a second portion.
Figure 13B:
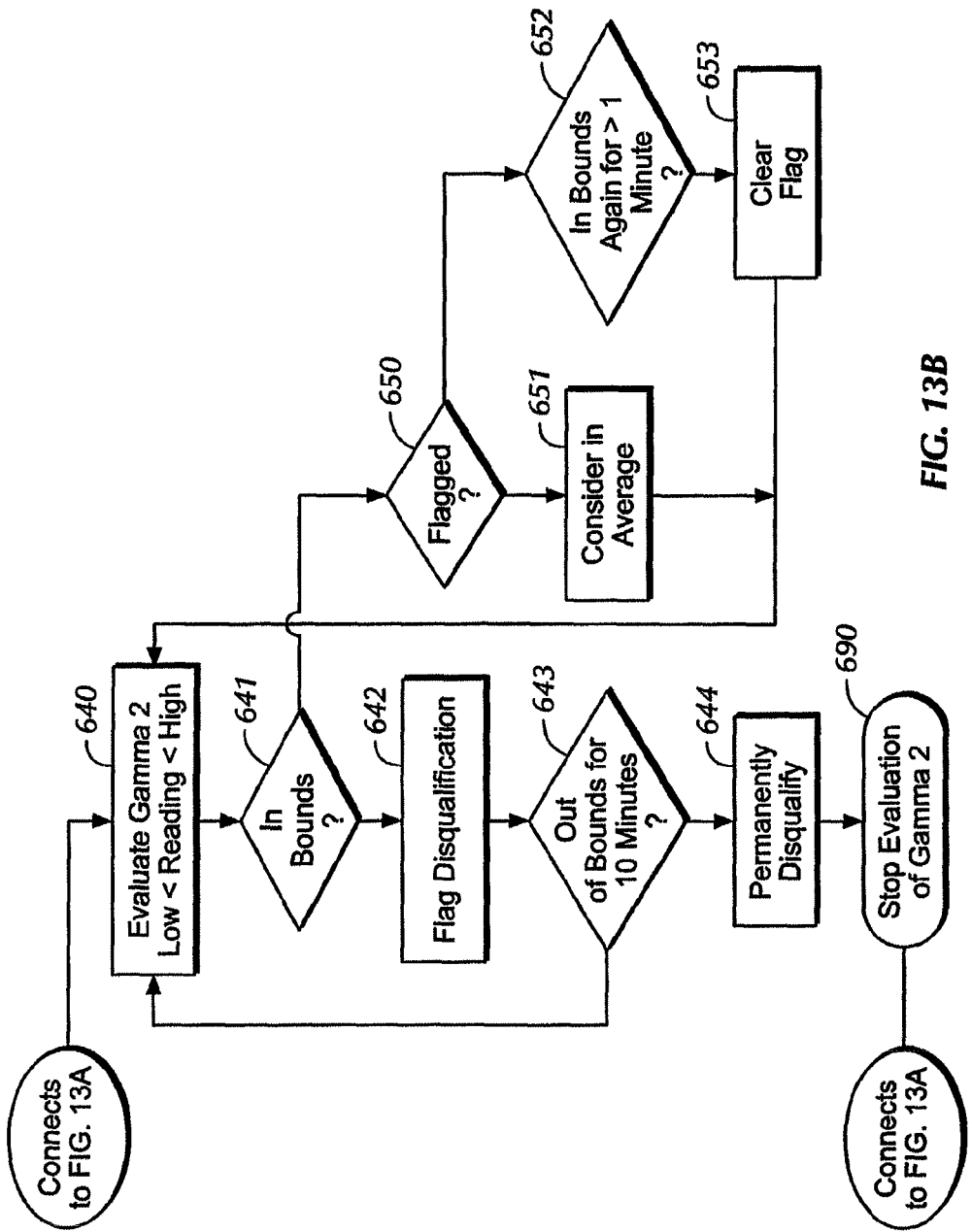
FIG. 13B depicts the second portion of a flow chart of a kick-out algorithm for the multiple gamma controller assembly of FIG. 1, with FIG. 13A depicting the first portion.

Referring to FIGS. 13A and 13B, two portions of a single flowchart of an example algorithm 600 run by the multiple gamma controller is shown. In this example, the system starts 610 and one algorithm routinely checks and logs telemeter status 660 so that location information can be associated with the readings collected by the probes. The health of the telemeter status readings can optionally be checked as part of this sequence using heuristics based algorithms. Collected data may be disqualified or data logging may be suspended if telemeter readings are called into question. A routine algorithm can also be run to evaluate gamma one 620 and evaluate gamma two 640, and determine if the counts received are between pre-determined high and low values. The pre-determined values can be different for different probe types of for different individual probes of the same type, this may be based on testing, calibration values, or the previous use of a given probe. Additionally, the high and low values may be set to different ranges for different rock formations and other environmental conditions. The gamma probe readings are each evaluated to determine if they are in bounds 621, 641 of the pre-determined range. If a value is determined to be in bounds 621, 641, a routine algorithm then checks to see if the gamma probe was recently flagged 630, 650. If the probe was flagged 630 650, it is not considered in the average 631, 651 but instead checked to be in bounds for a pre-determined time 632, 652, in this example, one minute. If the probe is in bounds for greater than one minute 632, 652, the flag disqualifying the probe is cleared 633, 653, and the next time the probe is checked and verified in bounds the readings from that probe will be considered in the average 631, 651. Alternatively, the probe readings may be considered in an average, combined, filtered, considered in a majority rules protocol comparison, or otherwise used as described in the various algorithms. As this is an example, in an alternate embodiment the probes can also be flagged and temporarily or permanently for various other reasons, consistent with what has been mentioned previously. When a probe is determined to be in bounds 621, 641 and determined to be not flagged 630, 650, it may then be considered in average 631, 651 or otherwise considered-good by the multiple gamma controller. A gamma probe that provides out of bounds data is flagged 622, 642 the first time it provides an out of bound result. If the gamma probe continues to provide out of bounds results in excess of the configured ten minute timeframe 623, 643 of this example, the probe can be permanently disqualified from use 624, 644. In this event, the multiple gamma controller assembly can be configured to send a message to a remote computer indicating the probes failure (not shown). When a probe is permanently disqualified 624, 644, evaluation of the probes output is stopped 625, 690. In an embodiment, the described sequences can optionally be carried out on more than two probes. Also, in an embodiment, this sequence need not be carried out on all of the probes configured, some probes can optionally remain inactive in a particular system configuration. If all of the probes in a given system are no longer being evaluated a count of zero will be recorded 634, indicating there may be a problem with the probes. As long as one probe remains operational and is returning readings, the tool can remain in use until a convenient service window opens, at which time the failing probes can be replaced.

More complex algorithms can be applied. For example, gamma sensors can be disqualified if one drifts apart from the other, or as well if they become too noisy and return values that are within bounds but erratic. All of the thresholds and disqualification parameters are configurable. In another embodiment, the multiple gamma controller assembly can be configured to exclude measurements or disqualify measurements based on the conditions at the time. For example, if a high shock (triboluminescence) event occurs, the assembly could suspend measurement or disqualify measurements for a given time period during or near the shock event. Other events may also suspend measurement, another example might be when other operations are being performed by the measurement while drilling tool or other downhole tools that could potentially give off electrical noise, the multiple gamma controller assembly can be notified before such an event occurs or be programmed with algorithms to detect such an event through sensor measurement or other methods. High temperature events can also receive similar treatment. The conditions which trigger these events are programmable and can vary based on the probes being used and their particular sensitivities.

Another example of a more complex algorithm involves the identification of a possible third failure mode, one where gamma probes are outputting measurements within high and low boundaries but where the output values have begun to skew from what would be considered accurate values. To identify this failure mode, a gamma probe health algorithm was developed that compares the statistical properties of multiple gamma probes to determine if one is beginning to fail. Similarly, this algorithm can be used by comparing known good or example data with the output data of one gamma probe. In an embodiment, this algorithm allows for the gamma probe health assembly or multiple gamma assembly to select whichever gamma probe is providing "cleaner" readings during a given time period, and also allows a gamma probe that is likely beginning to fail to be identified. Further, this algorithm can additionally be run on gamma probe output data sets in realtime or on a delay at the surface or remotely to assess the health of particular gamma probes or to otherwise qualify and/or disqualify data that has been collected.

A potentially failing or malfunctioning gamma probe may defined as a gamma probe which sporadically outputs inaccurate counts, but then returns to outputting correct values once the stress (e.g. elevated temperature and vibration) is reduced. While a failed gamma probe can be defined as a gamma probe that outputs inaccurate counts continuously, regardless of the environmental conditions. It can be useful to identify a potentially failing probe just as it can be useful to identify a completely failed gamma probe in that the data output by the potentially failing probe can be inaccurate or wrong for a given time period. A potentially failing probe may also fail faster than a well functioning probe, and therefore it's identification before it completely fails may be useful.

A multiple gamma controller assembly can provide two gamma probe output value logs that should match very closely if both gamma probes are working correctly. If a probe begins to fail it may slowly drift apart from the output values collected from the other probe. The skew can be tracked and compared by calculating a diversion factor. The diversion factor can be defined as:

$$D[n-l,n]=K_{std}x_{\sigma}[n-l,n]+K_{skew}x_{\gamma1}[n-l,n]+K_{kurt}x_{\beta2}[n-l,n]$$

where D is the "differential diversion factor" and $K_{std}$, $K_{skew}$, and $K_{kurt}$ are predetermined weighting factors, n is the current sample, and l is the window size. Additionally, $x_{\sigma}[n-l, n]$ is the standard deviation, $x_{\gamma1}[n-l, n]$, is the skew, and $x_{\beta2}[n-l, n]$ is the kurtosis of the probability distribution of the samples within the window defined by [n-l, n], respectively. For example, a moving window of 60 samples (where each sample is 10 second apart) is used for the calculations of D below. A higher value of D indicates an overall lower quality gamma probe (i.e., a noisier and possibly failing or malfunctioning gamma probe), while a lower D represents a more stable gamma probe. The differential diversion threshold is the specific value of D that it would be desirable to stay within. A differential diversion factor or value outside of the differential diversion threshold indicates a potentially failing or malfunctioning gamma probe. The standard deviation σ can be defined as:

$$\sigma = \sqrt{\frac{1}{N}\sum_{i=1}^{N}(x_i-\mu)^2} \quad \text{where} \quad \mu = \frac{1}{N}\sum_{i=1}^{N}x_i$$

The standard deviation shows how much variation there is from the mean, μ, a low standard deviation means that the data points tend to be close to the mean. The skew is a measure of the extent to which a probability distribution leans to one side of the mean and can be defined $$as: \gamma_1 = \frac{E(x-\mu)^2}{\sigma^3}$$

The kurtosis $\beta_2$, is a measure of how outlier prone a distribution is and can be defined as:

$$\beta_2 = \frac{E(x-\mu)^4}{\sigma^4}$$

E representing the expected value, and x representing each individual sample. For example, a sample of five points with an assumption of an equal probability of each point would be calculated as:

$$E(x-\mu)^2 = \left(\frac{1}{5}(x_1-\mu)+(x_2-\mu)+(x_3-\mu)+(x_4-\mu)+(x_5-\mu)\right)^2$$

Figure 14A:
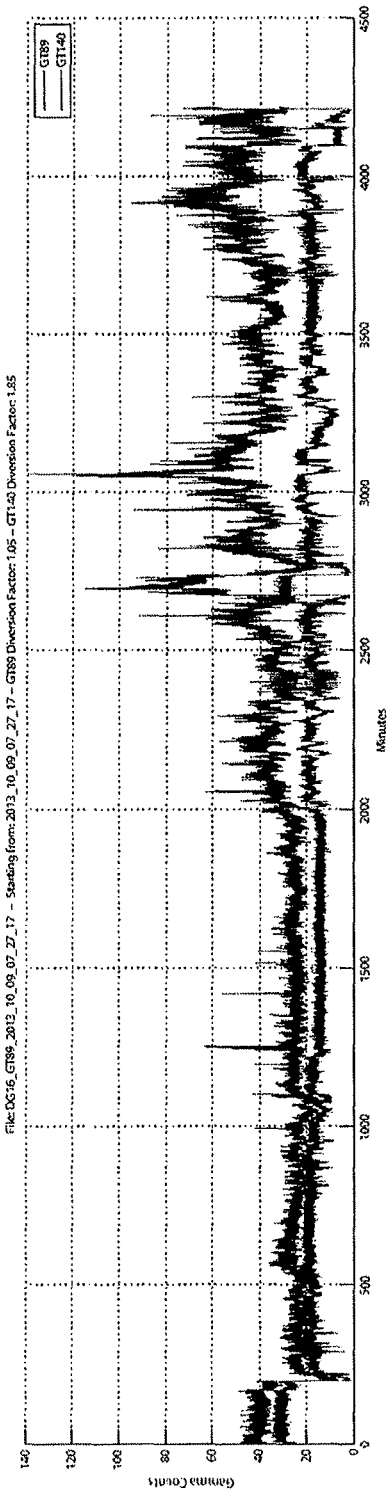
FIG. 14A depicts an illustration of raw gamma probe output values from two gamma probes.
Figure 14B:
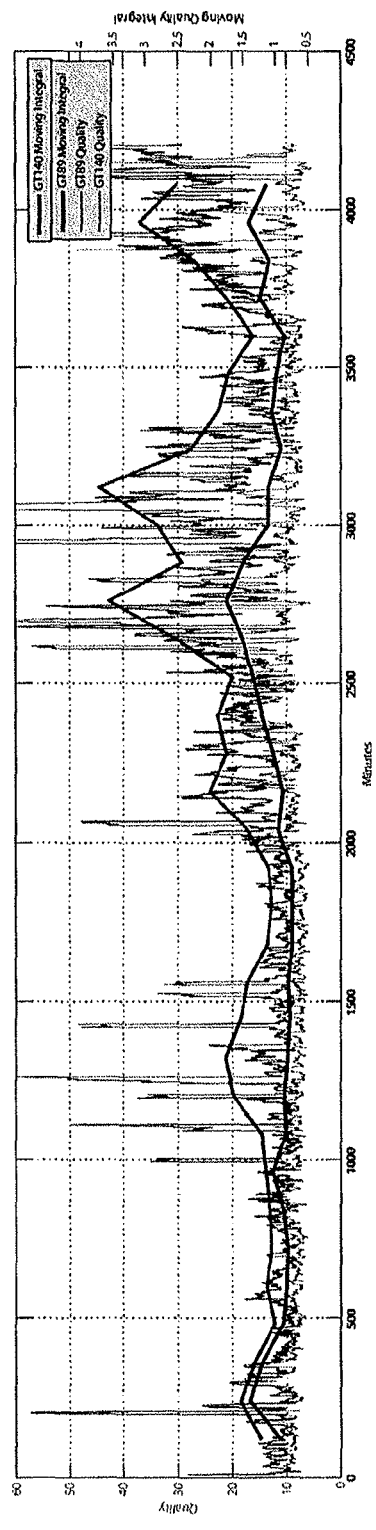
FIG. 14B depicts an illustration of processed gamma probe output values from two gamma probes, showing a calculated differential diversion factor for the probe outputs.

Referring to FIG. 14A, an illustration of raw gamma probe output values from two gamma probes are shown. FIG. 14B then illustrates process gamma probe outputs for the raw gamma probe outputs shown in FIG. 14A, and additionally illustrates the respective diversion factors for each probe as is shown by the bolded central lines running through each respective probes processed and filtered output values. It should be noted that the weighting factors used in this example were obtained empirically and are as follows: $K_{std}$=4.0, $K_{skew}$=1.5, and $K_{kurt}$=1.0. As is shown by the output values for each probe in this example, the potentially failing probe was returning higher output values throughout the illustrated time window. As the run continued, the potentially failing probe drifted higher and deviated much more than the other gamma probes output values. The Moving Diversion Integral lines in FIG. 14B were calculated using the following formula:

$$D_{int} = \frac{1}{T}\int_{t_1}^{t_2}D\,dt$$

where $T=t_2-t_1$ is the integration time period, and where D is defined as it was above. The Moving Diversion Integral is defined by the above equation and is represented by the bolded lines in FIG. 14B. The integration time used for the values shown was 120 minutes. The maximum value for the moving integral of the higher reading gamma probe was 3.71 and was 1.75 for the lower reading gamma probe. $D_{diff}$ can be calculated as follows:

$$D_{diff}=D_{1max}-D_{2max}$$

where $D_{1max}$ and $D_{2max}$ are the maximum diversion factor values of each probe respectively over the defined time window T. In this example, if $D_{diff}$ is positive and outside the bounds that would be defined as the differential diversion threshold, then the first gamma probe is potentially failing over the illustrated time period. If on the other hand, $D_{diff}$ were negative and outside the differential diversion threshold then the second gamma probe would be potentially failing over the illustrated time period.

Figure 15:
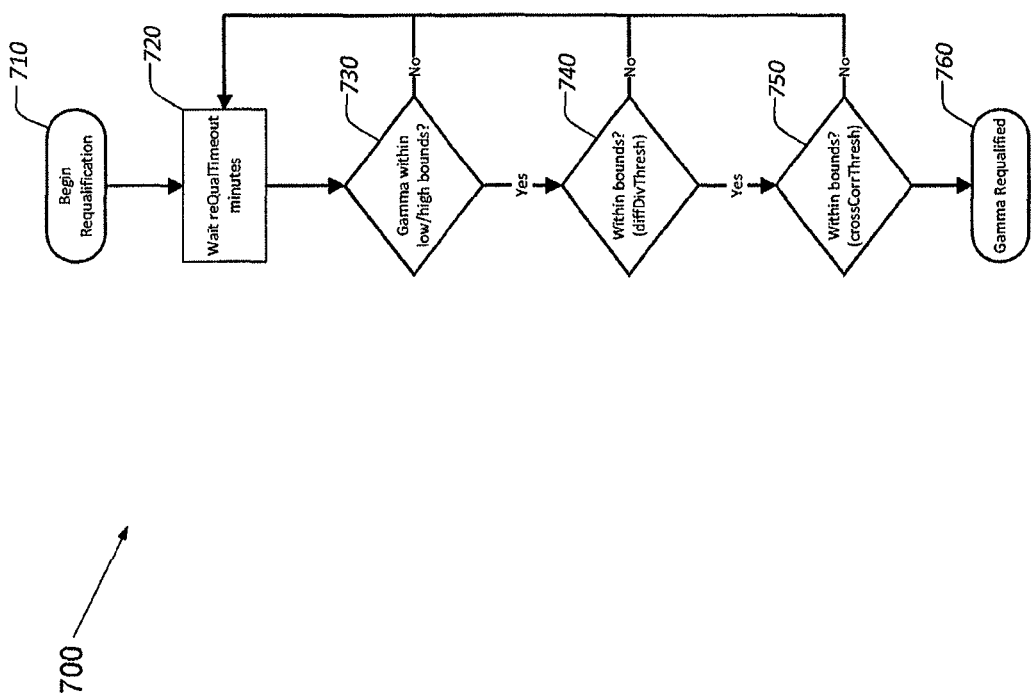
FIG. 15 depicts a flow chart for a gamma requalification process.

Referring to FIG. 15, a flow chart of an example algorithm for a gamma probe/sensor requalification process is shown. When a gamma probe has been disqualified, the microcontroller may run this or a similar process to determine if the probe might be requalified. In this example, the system begins requalification 710 and waits for a pre-set but configurable time period 720. After the time period has passed the next step determines if the gamma probe outputs are now within the high and low boundaries 730. If the gamma probe output values are not within bounds the logic returns to step 720 and again waits for the pre-set but configurable time period. If the gamma probe output value is within bounds, it is next determined whether or not the gamma probe output is within the differential diversion threshold 740, which may be calculated realtime or preset as was discussed previously. If the gamma probe output value is not within bounds of the differential diversion threshold, the logic returns to step 720 and again waits for the pre-set but configurable time period. If the gamma probe output value is within the differential diversion threshold bounds, it is next determined whether or not the gamma probe output is within the cross correlation threshold 740, which may also be calculated realtime or preset as was discussed previously. If the gamma probe output value is not within bounds of the cross correlation threshold, the logic returns to step 720 and again waits for the pre-set but configurable time period. If the gamma probe output value is within the cross correlations threshold bounds, the gamma probe is then re-qualified and that gamma probes measurement output values can then be trusted by the downhole gamma probe health detection assembly and treated accordingly.

Figure 16:
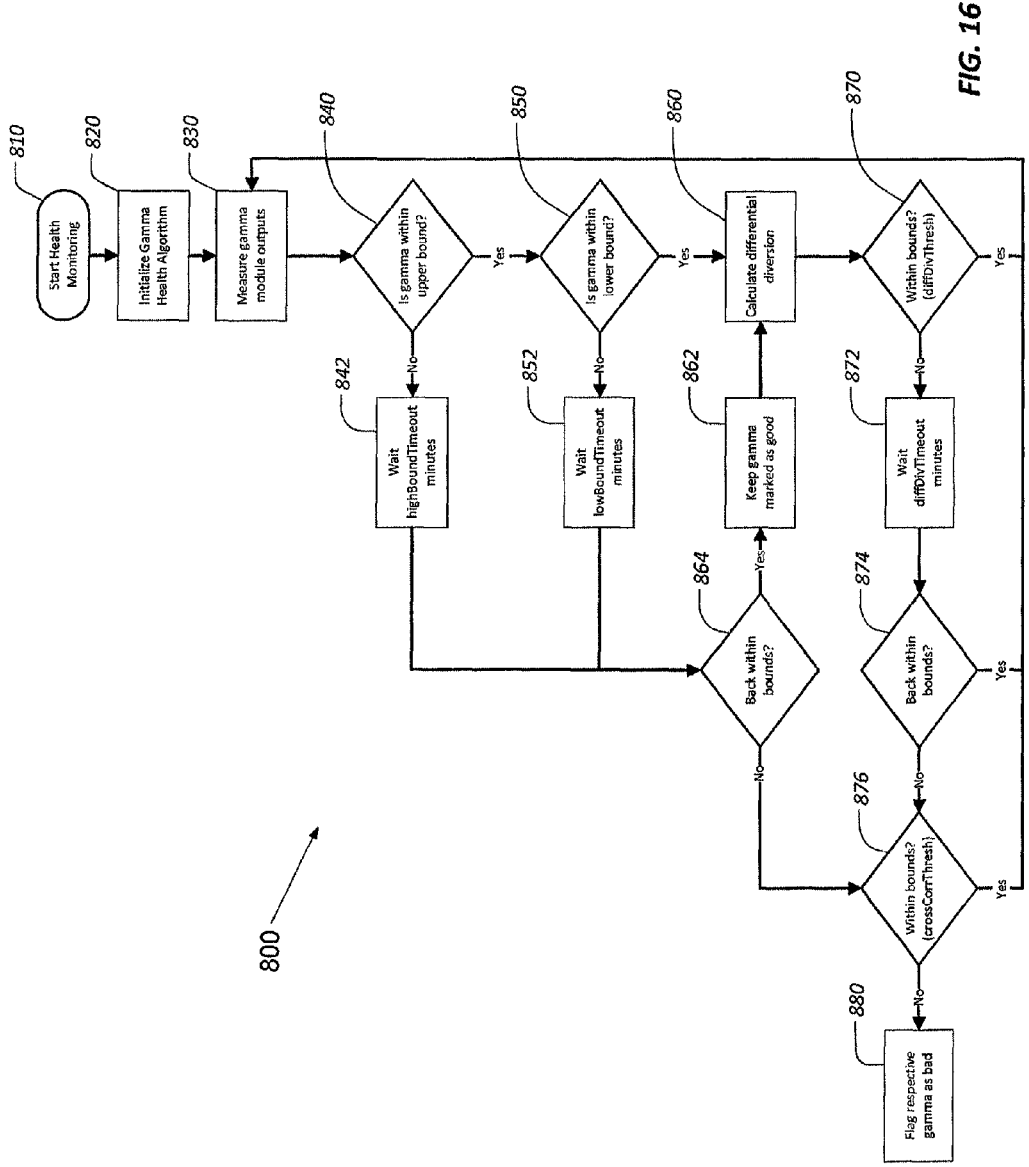
FIG. 16 depicts a flow chart for a gamma health monitoring process.

Referring to FIG. 16, a flow chart of an example algorithm for a gamma health monitoring process is shown. In this example, the system begins gamma probe health monitoring 810 and run through any initialization steps for the gamma health algorithm 720. The one or more gamma probe module measurement outputs are taken 830. The measurement for each module configured is then determined to be within or outside of a configurable upper boundary 840. If the gamma probe output is determined to not be within the upper boundary an upper boundary timeout period is entered 842 at least in regard to the processing of that particular gamma probes output values. If the gamma probe output is within the upper boundary it is then determined to be within or outside of a configurable lower boundary 850. If the gamma probe output is determined to not be within the lower boundary a lower boundary timeout period is entered 852 at least in regard to the processing of that particular gamma probes output values. If the gamma probe output is within the lower boundary differential diversion is then calculated in realtime or determined from a table of known or previously calculated differential diversion values for that probe or probe type 860. If a gamma probe output was outside a boundary, such as in steps 842 and 852, and the timeout period has ended for that particular probe, that probe is then checked again to determine if its output is within upper and lower boundaries 864. If that gamma probes output is back within bounds, it is then flagged or marked as good or trusted again 862 and then a differential diversion factor may be calculated 860. Once a differential diversion factor is calculated or determined, as previously discussed, the differential diversion is then determined to be within or outside of a differential diversion threshold. As long as the one or more gamma probe output values are within the differential diversion threshold, the gamma probe measurements are taken again 830, and this process continues to repeat itself. If the differential diversion for a particular probe is determined to not be within the differential diversion threshold, a configurable timeout period is entered before the gamma probe output values from that probe are treated as trusted again 872. The differential diversion for that probe is then tested as to whether or not it is back within bounds 874. If the differential diversion is back in bounds, the probe is re-qualified or treated as trusted again and gamma module outputs are read again 830. If the differential diversion factor for that particular probe is still out of bounds, then the differential diversion factor is checked against the cross correlation threshold 876. Of the probe is within that threshold then readings can again be taken from that probe. If the probe is outside of the cross correlation threshold, the respective probe is flagged and more permanently disqualified as malfunctioning probe 880.

Figure 17:
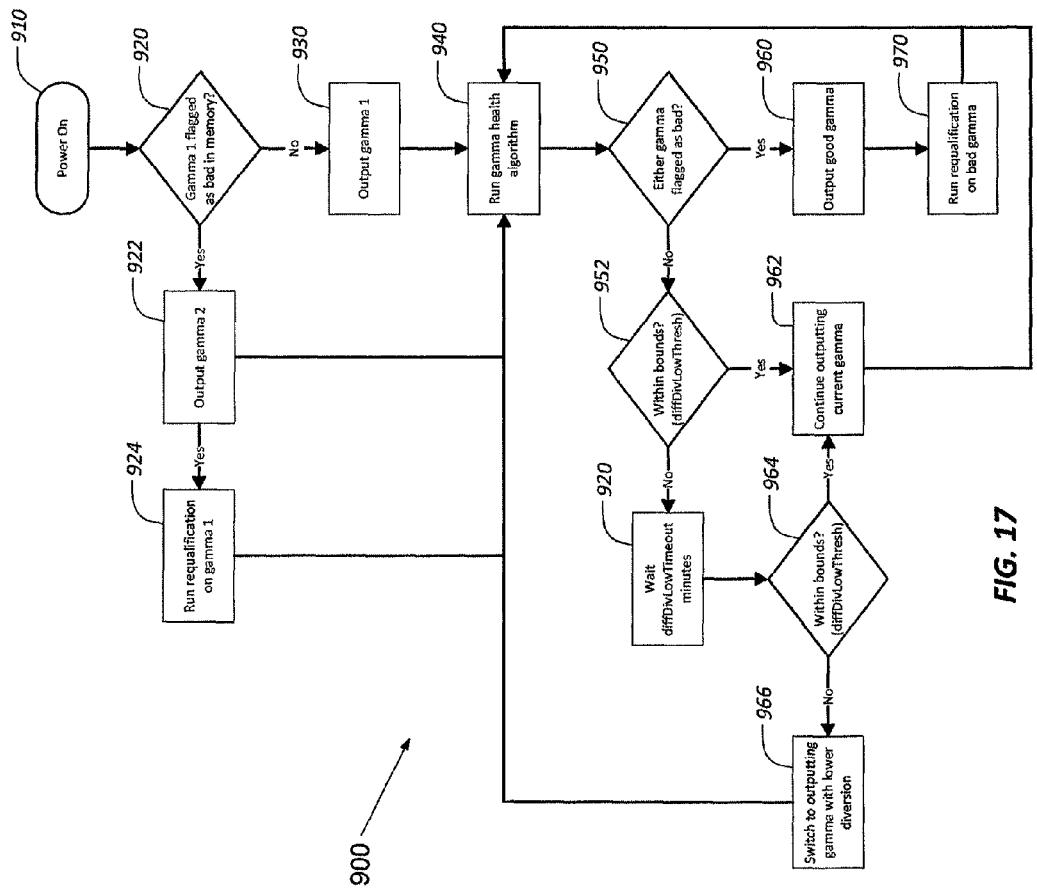
FIG. 17 depicts a flow chart for a gamma output process where a gamma health process and a gamma requalification process are included in the gamma output process.

Referring to FIG. 17, a flow chart for a gamma output process 900 where a gamma health process and a gamma requalification process are included in the gamma output process is shown. In this example, the system begins by powering on the gamma probe health controller assembly and any included gamma probes 910. A determination is then made as to whether a first gamma probe is flagged as bad in memory 920. If the first gamma probe is flagged as bad in memory, it is determined if the second gamma probe is flagged as good or bad in memory and if so, the second gamma probes output data is collected 922. Requalification is run on the first gamma probe if it has been previously flagged as bad 924. If the first gamma probe is not flagged as bad in memory the first gamma probes output is collected 930. The gamma health algorithm based on the calculation of a diversion factor as outlined above is then run once the outputs of multiple gamma probes have been collected 940. Next, it is determined if either gamma probe should be or has been flagged as bad 950. If no gamma probe that is being compared has been flagged as bad, then it is determined if the gamma probe output values are within the configurable lower differential diversion threshold 952. If it is determined that one or more probes is not within the lower differential diversion threshold then a lower differential diversion threshold miss timeout occurs 920. During this timeout a configurable period of time is set waited through before a determination is made on the particular probes being compared. Going back to step 950, if any of the gamma probes are flagged as bad then the remaining "good gamma" probes output value is utilized. This can mean that the "good gamma" probes output is written to a memory log downhole or sent to the surface for logging and/or use. A requalification determination is then made on any gamma probes determined to be or flagged as "bad" 970. Going back to step 952, if it is determined that both or all gamma probe outputs are currently within the lower differential diversion threshold, then the tool will utilize and log of send uphole the current gamma probe being output. Optionally, if both or all gamma probes being utilized are within the lower differential diversion threshold then the gamma probe output values can be averaged or otherwise combined in an embodiment where one gamma probe output is needed. Optionally as well, both gamma probe output values can be logged with a trusted flag. Similarly, when gamma probes have been determined as bad or flagged for any reason, there data can still be logged with a trusted flag unset or another flag indicating the reason the gamma probes output data values are not being trusted at that particular time. If after the timeout of step 920, it is determined that the output data of both or all of the gamma probes is back within the lower differential diversion threshold 964, then the gamma probe output data can be logged or sent uphole according to the current output configuration of the tool 962. If after the timeout, it is determined that a particular gamma probes output is still out of bounds of the lower differential diversion threshold, then the tool can switch to routinely outputting or logging as trusted the gamma probe output data of another probe 966. Additionally, regarding steps 952, 920, and 964, additional similar steps can be run and added to this algorithm that relate to the configurable and calculated higher differential diversion threshold.

Each of the steps and sub-steps of the example embodiments described in FIGS. 15-17 can be configured to either be run and be a part of an algorithm or can be configured to not be run and not be part of an algorithm.

In addition to calculating the differential diversion factor downhole by an assembly having a micro-controller or other type of processor, it should be understood that probe output values could be sent to the surface for realtime or delayed calculation of the differential diversion factor at the surface or even at remote sites via post processing. Further, the calculated differential diversion factors could be sent to the surface themselves, at which point the various comparisons, qualifications, assessments, and any other post processing can be performed. The flowcharts of FIGS. 15-17 contain various steps which can generally be split between the downhole controller assembly and a computer or microcontroller assembly at the surface in terms of what steps and what calculations are being performed where. Offsite processing can additionally be a part of realtime or delayed data collection efforts, with some of the calculations and steps outlined above and in the flowcharts of FIGS. 15-17 being performed away from the wellsite. Particularly where a single gamma probe is run downhole to collect data, the data collected might more ideally be compared to known good or example data in a post processing environment between runs downhole. Additionally, when data is being collected from multiple gamma probes downhole, data might again more ideally be pulled from the tool itself at the surface, at which time post-processing can be run to calculate the differential diversion factors over various time periods and generally post-qualify the data that was collected. An offsite computer can be utilized to post-process the gamma probe output data and compare gamma probe output data from multiple probes. The data collected by the probe in any of the mentioned embodiments can either be sent to the surface while the tool is located downhole or collected from the tool by a USB cable, serial connection, parallel connection, or other common bus when the tool is back at the surface or at a remote site. Differential diversion factors can also be calculated downhole without storing the calculation data to a log or memory. This embodiment preserves available memory for gamma probe output data while still enabling the running of advanced failure detection algorithms. Further in this embodiment, the data will send a flag to the surface or log relevant information to memory only when the data detects a potentially bad gamma probe.

To assist with failure analysis when the tool is being serviced, the multiple gamma controller assembly can log several relevant parameters of the gamma controller assembly or of other components of the tool as it is operating. There are at least two classifications of events that can be logged: time-based logs and event-based logs. Time-based logs can include parameters that are logged periodically regardless of what is happening with the tool. Examples of this include temperature, battery voltages, motor bus voltage, axial vibration, lateral vibration, moving average of the counts from each gamma probe, etc. Event-based logs can include specific events that may occur, including axial or lateral shock events, as monitored by the accelerometers or other similar sensors, changes in the state of the flow signal, changes in the state of the pulse line, the duration of a pulse event, etc.

In an embodiment, the multiple gamma controller can be configured with "high-g" and "low-g" accelerometers to measure shock and vibration measurements. Generally, shock can be considered events above 25 G, and can be recorded along with other information, such as time, date, and other sensor values. Recording the number of shock events provides a good predictor of a particular type of drilling environment and allows the prediction of the remaining lifetime of the multiple gamma assembly for a certain number of gamma probes in that type of environment or at that particular wellsite. If a shock is recorded above a very high threshold, immediate replacement of the crystal and photomultiplier assembly can be considered as they may be very close to failure if not already malfunctioning. Messages can be sent by the microcontroller through the measurement while drilling tool interface or separately to the surface to alert operations personnel. The same considerations can be applied to vibration measurement by the "low-g" accelerometers. The multiple gamma assembly can be configured such that down-hole vibration levels can be continuously calculated and logged to memory. Additionally the multiple gamma assembly can also be configured with on-board temperature sensors and the complete temperature profile history may be tracked since high temperatures also place very high stress on the board. Thresholds may be set for temperature events and similarly to gamma failure, shock, or vibration events, messages can be sent to the surface through the measurement while drilling tool interface or through a separate interface to the surface.

In another embodiment, event "odometers" can be setup to tack the various tool health indicators, such as the various sensor values, as previously mentioned. The odometers may accumulate value as separate, shock, vibration, and temperature odometers, and provide an idea to the tool operators of the general abuse a particular tool has taken. This may be useful to determine and improve upon common modes of failure for a particular tool design. For example, it may be found that tools with a certain level on their vibration odometers are likely fail within a calculated timeframe based on tool data compiled over time. Vibration odometers can be configured to represent total time spent at vibration levels corresponding to bin divisions. Temperature odometers can be configured to represent total time spent at temperature levels corresponding to bin divisions. Odometers can optionally be reset when the multiple gamma controller assembly is paired with different gamma probes or when the multiple gamma controller circuit board is replaced.

In an embodiment, the gamma health detection assembly can be configured to apply individual calibrations for each gamma probe, optionally applying the calibrations before averaging or determination operations are performed. The averaged or calculated values can be transmitted to the measurement while drilling tool as synthesized voltage pulses as well as through the generic variable communication mean available, such as by a serial port communication to the measurement while drilling tool. The measurement while drilling tool is programmed with a calibration of 1.0 (multiplier) so as not to skew the data calculated by the multiple gamma controller assembly, for a given embodiment.

These logs allow the failures of the gamma probes to be analyzed and improve future operational guidelines to help prevent future failures of gamma probes downhole. Additionally, these logs allow predictive maintenance to be performed by preemptively replacing gamma probes that are likely to fail soon, before a downhole failure occurs. Gamma probes are generally constructed by pairing NaI(TI) (Sodium Iodide/Thalium) crystals with photomultiplier tubes. The probes also often have high voltage supply circuitry and a discriminator circuit integrated as well. Each component and the paired assembly have inherent structural weaknesses and can malfunction when exposed by the harsh conditions of a drilling environment. The gamma probe components are very temperature, vibration and shock sensitive, and often break irreparably in the drilling environment. In addition, the photomultiplier has glass components, which are particularly sensitive to vibration and shock.

In an embodiment and as an example, a gamma probe can be configured to produce a pulse when a gamma wave/particle emitted from a geological formation comes into contact with the NaI(TI) crystal of the gamma probe. When collision occurs, a photon is produced. A hermetically sealed enclosure of the crystal is internally reflective, and will guide the photon out of one open end of the crystal, which can be configured with a clear glass lens. The photon will travel out of the crystal, through the optical lens, and into a photomultiplier tube of the gamma probe. When the photon strikes a particular surface of the photomultiplier tube, an electrical current pulse is generated. The photomultiplier tube's purpose is to convert the photon into electrical energy so that it can be sent to and interpreted/read by the microcontroller circuitry of the multiple gamma controller assembly. A high voltage power supply is required to operate the photomultiplier tube. For example, photomultiplier tubes often require voltages around 1500V DC. Other gamma probe designs can be substituted for this design in the embodiments described.

Although the concepts disclosed herein have been described in connection with the preferred form of practicing them and modifications thereto, those of ordinary skill in the art will understand that many other modifications can be made thereto. Accordingly, it is not intended that the scope of these concepts in any way be limited by the above description.

The invention claimed is:

1. A downhole measurement assembly to facilitate the reliable downhole measurement of radiation given off by geological formations adjacent a wellbore, the downhole measurement assembly comprising:
   one or more gamma probes to sense radiation given off by downhole formations and to provide output pulses representative of the radiation,
   one or more microcontrollers, at least one of which is configured to receive the output pulses from the one or more of gamma probes, at least one microcontroller configured to detect when one of the one or more of gamma probes is providing output pulses that may indicate one or more probes has malfunctioned, the microcontroller configured to assign a representative data value to the output pulses of the one or more gamma probes, to calculate a differential diversion factor for each of the one or more gamma probes, and to determine when the one or more of the gamma probes differential diversion factor indicates the one or more gamma probes may be close to malfunctioning, and
   one or more memory elements to store gamma controller assembly executable code and gamma probe data.

2. The downhole measurement assembly of claim 1, further comprising:
   one or more power supplies to provide power to the one or more microcontrollers, the one or more gamma probes, and the one or more memory elements.

3. The downhole measurement assembly of claim 1, further comprising:
   one or more communications pathways between each of the one or more gamma probes and at least one of the one or more microcontrollers, wherein the output pulses of each of the one or more gamma probes are configured to be communicated on the one or more communications pathways to the at least one of the one or more microcontrollers for interpretation and logging to memory.

4. The downhole measurement assembly of claim 1, wherein the one or more microcontrollers are configured to analyze the output pulses of each of the one or more gamma probes to determine if one or more probes has malfunctioned.

5. The downhole measurement assembly of claim 1, wherein the one or more microcontrollers are configured to disqualify or disregard the output pulses from each of the one or more gamma probes, when the each of the one or more gamma probes is determined to be close to malfunctioning or determined to be malfunctioning.

6. The downhole measurement assembly of claim 5, wherein the one or more microcontrollers are configured to continue analyzing the output pulses from each of the one or more gamma probes that have been disqualified or disregarded and re-qualify each of the one or more gamma probes that have returned to acceptable operating parameters.

7. The downhole measurement assembly of claim 1, further comprising:
   one or more communication pathways to convey gamma probe data between the downhole measurement assembly and a remote computer.

8. A method of measuring radiation given off by geological formations downhole, the method including the following steps:
   deploying a radiation measurement assembly downhole, the radiation measurement assembly comprising:
      one or more gamma probes to sense radiation given off by downhole formations and provide output pulses representative of the radiation,
      one or more microcontrollers, at least one of which is configured to calculate differential diversion factors for the output pulses of the one or more gamma probes, and
      one or more memory elements for storing the gamma controller assembly executable program and for logging gamma probe data;
   sensing radiation given off downhole from formations by the one or more of gamma probes, the one or more of gamma probes each generating pulses that are communicated to at least one of the one or more microcontrollers;
   interpreting the pulses given off by each of the one or more of gamma probes by at least one of the one or more microcontrollers such that the pulses are each assigned representative data;
   calculating, by at least one of the one or more microcontrollers, a differential diversion factor for each of the one or more gamma probes;
   determining if one or more of the differential diversion factors calculated for each of the one or more gamma probes may indicate that a particular one of the gamma probes may be close to malfunctioning; and
   disqualifying one of the one or more of gamma probes, responsive to the determining step, such that the pulses output by the disqualified gamma probe are no longer considered valid.

9. The method of claim 8, further comprising the step of:
   determining of one or more of the differential diversion factors calculated for each of the one or more gamma probes indicates that a particular one of the gamma probes has malfunctioned.

10. The method of claim 9, further comprising the step of:
    disqualifying or flagging previously gathered data associated with the one or more gamma probes that has been determined to have malfunctioned, at least for a time period over which the gamma probe was known to have been malfunctioning.

11. A downhole measurement assembly to facilitate the reliable downhole measurement of radiation given off by geological formations adjacent a wellbore, the downhole measurement assembly comprising:
    one or more of gamma probes to sense radiation given off by downhole formations and provide output pulses representative of the radiation,
    one or more microcontrollers, at least one of which is configured to detect when one of the one or more of gamma probes is providing output pulses that may indicate the probe has malfunctioned,
    a communication pathway between each of the one or more of gamma probes and at least one of the one or more microcontrollers wherein the output pulses of each of the one or more of gamma probes are communicated on the communication pathway to at least one of the one or more microcontrollers for interpretation and logging, one or more communication pathways to convey gamma probe data between the downhole measurement assembly and a remote computer, and non-transitory computer-readable storage medium in communication with the one or more microcontrollers with an executable program stored thereon, the executable program comprising a set of instructions that, when executed by the one or more microcontrollers, causes the one or more microcontrollers to perform the operations of:

sensing radiation given off downhole from formations by the one or more of gamma probes, the one or more of gamma probes each generating pulses that are communicated to at least one of the one or more microcontrollers;

interpreting the pulses given off by each of the one or more of gamma probes by at least one of the one or more microcontrollers such that the pulses are each assigned representative data;

calculating, by at least one of the one or more microcontrollers, a differential diversion factor for each of the one or more gamma probes;

determining if one or more of the differential diversion factors calculated for each of the one or more gamma probes may indicate that a particular one of the gamma probes may be close to malfunctioning; and disqualifying one of the one or more of gamma probes, responsive to the determining step, such that the pulses output by the disqualified gamma probe are no longer considered valid.

12. A downhole measurement assembly as defined in claim 11, wherein the non-transitory computer-readable storage medium further comprises a set of instructions that when executed by the one or more microcontrollers, causes the one or more microcontrollers to perform the operations of:

interpreting the pulses given off by at least one of the disqualified gamma probes by at least one of the one or more microcontrollers such that the pulses are each assigned representative data;

calculating, by at least one of the one or more microcontrollers, a differential diversion factor for each of the at least one disqualified gamma probes;

determining if one or more of the differential diversion factors calculated for each of the at least one disqualified gamma probes may indicate that a particular one of the disqualified gamma probes has resumed functioning within predetermined bounds; and re-qualifying one of the disqualified gamma probes, responsive to the determining step, such that the pulses output by the re-qualified gamma probe are considered valid.

13. A downhole measurement assembly as defined in claim 11, wherein the non-transitory computer-readable storage medium further comprises a set of instructions that when executed by the one or more microcontrollers, causes the one or more microcontrollers to perform the operations of:

logging representative data to memory by at least one of the one or more microcontrollers.

14. A computer-implemented method to facilitate the reliable downhole measurement of radiation given off by geological formations adjacent a wellbore, the computer-implemented method comprising the following steps:

sensing radiation given off downhole from formations by the one or more of gamma probes, the one or more of gamma probes each generating pulses that are communicated to at least one of the one or more microcontrollers;

interpreting the pulses given off by each of the one or more of gamma probes by at least one of the one or more microcontrollers such that the pulses are each assigned representative data;

calculating, by at least one of the one or more microcontrollers, a differential diversion factor for each of the one or more gamma probes;

determining if one or more of the differential diversion factors calculated for each of the one or more gamma probes may indicate that a particular one of the gamma probes may be close to malfunctioning; and disqualifying one of the one or more of gamma probes, responsive to the determining step, such that the pulses output by the disqualified gamma probe are no longer considered valid.

15. The computer-implemented method of claim 14, wherein the computer-implemented method further comprises the following steps:

interpreting the pulses given off by at least one of the disqualified gamma probes by at least one of the one or more microcontrollers such that the pulses are each assigned representative data;

calculating, by at least one of the one or more microcontrollers, a differential diversion factor for each of the at least one disqualified gamma probes;

determining if one or more of the differential diversion factors calculated for each of the at least one disqualified gamma probes may indicate that a particular one of the disqualified gamma probes has resumed functioning within predetermined bounds; and re-qualifying one of the disqualified gamma probes, responsive to the determining step, such that the pulses output by the re-qualified gamma probe are considered valid.

16. The computer-implemented method of claim 14, wherein the computer-implemented method further comprises the following steps:

logging representative data to memory by at least one of the one or more microcontrollers.

17. The computer-implemented method of claim 14, wherein the computer-implemented method further comprises the following steps:

indicating to a remote computer at the surface when one or more of the gamma probes has been disqualified.

18. The computer-implemented method of claim 14, wherein the computer-implemented method further comprises the following steps:

indicating to a remote computer at the surface when one or more of the gamma probes has been re-qualified.

19. The computer-implemented method of claim 14, wherein the computer-implemented method further comprises the following steps:

communicating to a measurement while drilling tool, by the one or more microcontrollers, representative data of the measurements taken by the one or more gamma probes.

20. The computer-implemented method of claim 14, wherein the computer-implemented method further comprises the following steps:

communicating to a measurement while drilling tool, the calculated differential diversion factors associated with the one or more gamma probes.

21. A system to facilitate the reliable measurement and analysis of radiation given off by geological formations adjacent a wellbore, the system comprising:
  a downhole measurement assembly, comprising:
    one or more gamma probes to sense radiation given off by downhole formations and to provide output pulses representative of the radiation,
    one or more memory elements to store gamma controller assembly executable code and gamma probe data, and
    one or more microcontrollers, at least one of which is configured to receive the output pulses from the one or more of gamma probes, the at least one microcontroller configured to assign a representative data value to the output pulses of the one or more gamma probes and write the representative data value to the one or more memory elements, thereby logging the representative data, the logged representative data forming the gamma probe data;
  a surface assembly, comprising:
    one or more computers configured to process the gamma probe data either in real-time or by post-processing the data to detect when the gamma probe data may indicate that one or more probes has malfunctioned, the one or more computers configured to calculate a differential diversion factor for each of the one or more gamma probes over a pre-determined period of time, the one or more computers further configured to determine when the one or more of the gamma probes differential diversion factor indicates the one or more gamma probes may be close to malfunctioning or malfunctioning.

22. The downhole measurement assembly of claim 21, further comprising:
  one or more power supplies to provide power to the one or more microcontrollers, the one or more gamma probes, and the one or more memory elements.

23. The downhole measurement assembly of claim 21, further comprising:
  one or more communications pathways between each of the one or more gamma probes and at least one of the one or more microcontrollers, wherein the output pulses of each of the one or more gamma probes are configured to be communicated on the one or more communications pathways to the at least one of the one or more microcontrollers for interpretation and logging to memory.

24. The surface assembly of claim 21, wherein the one or more computers are configured to analyze the gamma probe data in realtime to determine if one or more gamma probes has malfunctioned.

25. The surface assembly of claim 21, wherein the one or more computers are configured to disqualify or disregard the gamma probe data from each of the one or more gamma probes, when the each of the one or more gamma probes is determined to be close to malfunctioning or determined to be malfunctioning.

26. The surface assembly of claim 25, wherein the one or more microcontrollers are configured to continue analyzing the gamma probe data from each of the one or more gamma probes that have been disqualified or disregarded and re-qualify each of the one or more gamma probes that have returned to acceptable operating parameters.

27. The system of claim 21, further comprising:
  one or more communication pathways to convey gamma probe data in real-time between the downhole measurement assembly and the surface assembly.

28. The system of claim 21, further comprising:
  one or more systems to convey gamma probe data between the downhole measurement assembly and the surface assembly for post-processing of the gamma probe data at the surface.

* * * * *